(12) United States Patent
Sun et al.

(10) Patent No.: US 8,976,749 B2
(45) Date of Patent: Mar. 10, 2015

(54) METHOD AND BASE STATION FOR DYNAMIC ADJUSTMENT OF CARRIER RESOURCE

(71) Applicant: Huawei Technologies Co., Ltd., Shenzhen (CN)

(72) Inventors: Guolin Sun, Shenzhen (CN); Feng Ye, Chengdu (CN); Yong Xie, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 13/741,689

(22) Filed: Jan. 15, 2013

(65) Prior Publication Data

US 2013/0128840 A1 May 23, 2013

Related U.S. Application Data

(63) Continuation of application No. PCT/CN2011/073960, filed on May 12, 2011.

(30) Foreign Application Priority Data

Jul. 15, 2010 (CN) .......................... 2010 1 0229817

(51) Int. Cl.
*H04W 4/00* (2009.01)
*H04W 72/04* (2009.01)
(Continued)

(52) U.S. Cl.
CPC .............. *H04W 72/04* (2013.01); *H04L 5/0007* (2013.01); *H04L 5/001* (2013.01); *H04L 5/003* (2013.01);
(Continued)

(58) Field of Classification Search
CPC ........ H04W 92/00; H04W 72/04; H04B 1/00; H04B 7/00
See application file for complete search history.

(56) References Cited

U.S. PATENT DOCUMENTS

| 8,112,094 B1 * | 2/2012 | Wellington ................... 455/453 |
| 2006/0198294 A1 * | 9/2006 | Gerlach ........................ 370/208 |

(Continued)

FOREIGN PATENT DOCUMENTS

| CN | 1983918 A | 6/2007 |
| CN | 101242204 A | 8/2008 |

(Continued)

OTHER PUBLICATIONS

Communication from a foreign counterpart application, International Application No. PCT/CN2011/073960, English Translation, International Search Report dated Aug. 25, 2011, 4 pages.

(Continued)

*Primary Examiner* — Anez Ebrahim
(74) *Attorney, Agent, or Firm* — Conley Rose, P.C.; Grant Rodolph; Nicholas K. Beaulieu

(57) ABSTRACT

A method and base station for dynamic adjustment of a carrier resource are disclosed. First, a cell-edge traffic volume of a local cell is detected; then, if the cell-edge traffic volume of the local cell is reduced, an idle primary subcarrier resource in the cell is released as a secondary subcarrier according to a degree of reduction of the cell-edge traffic volume and according to a multiple of a predetermined minimum granularity. With it, when the cell-edge traffic volume of the local cell is changed, the allocation of a primary subcarrier and a secondary subcarrier may be adjusted dynamically, which increases a utilization rate of a spectrum and ensures that carrier resources can be utilized properly and adequately.

12 Claims, 10 Drawing Sheets

(51) Int. Cl.
*H04L 5/00* (2006.01)
*H04W 16/10* (2009.01)
*H04W 72/00* (2009.01)
*H04W 88/08* (2009.01)

(52) U.S. Cl.
CPC .............. *H04L 5/006* (2013.01); *H04W 72/00* (2013.01); *H04W 72/0453* (2013.01); *H04W 88/08* (2013.01); *H04W 16/10* (2013.01); *H04L 5/0087* (2013.01); *H04W 72/0486* (2013.01)
USPC .......... 370/329; 370/328; 370/331; 370/310; 455/464; 455/509

(56) References Cited

U.S. PATENT DOCUMENTS

| | | | | |
|---|---|---|---|---|
| 2008/0287068 | A1* | 11/2008 | Etemad | .......................... 455/68 |
| 2009/0092091 | A1 | 4/2009 | Balasubramanian | |
| 2010/0074359 | A1 | 3/2010 | Tanigawa et al. | |
| 2011/0103241 | A1 | 5/2011 | Cho et al. | |
| 2013/0084795 | A1* | 4/2013 | Van Phan et al. | ............... 455/15 |

FOREIGN PATENT DOCUMENTS

| | | |
|---|---|---|
| CN | 101600212 A | 12/2009 |
| WO | 2010011112 A2 | 1/2010 |

OTHER PUBLICATIONS

Foreign Communication From a Related Counterpart Application, PCT Application PCT/CN02011/073960, English Translation of Written Opinion dated Aug. 25, 2011, 3 pages.

Mao, X., et al., "Adaptive Soft Frequency Reuse for Inter-cell Interference Coordination in SC-FDMA Based 3GPP LTE Uplinks," Proceedings from IEEE Global Telecommunications Conference, 2008, 6 pages.

Foreign Communication From a Counterpart Application, European Application No. 11806244.7, Extended European Search Report dated Jun. 12, 2013, 6 pages.

* cited by examiner

METHOD AND BASE STATION FOR DYNAMIC ADJUSTMENT OF CARRIER RESOURCE

CROSS-REFERENCE TO RELATED APPLICATIONS

This application is a continuation of International Application No. PCT/CN2011/073960, filed on May 12, 2011, which claims priority to Chinese Patent Application No. 201010229817.8, filed on Jul. 15, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the network communication technologies, and in particular, to a method and base station for dynamic adjustment of a carrier resource.

BACKGROUND

A soft frequency reuse technology is an effective interference coordination technology and is mainly used in a cellular communication system where orthogonal frequency division multiplexing (OFDM) is adopted. It solves a problem that when a user in a cell performs uplink and downlink access in an orthogonal frequency division multiple access (OFDMA) manner and a neighboring cell uses a same frequency resource for networking and service transport, user transport performed by using the same frequency resource at the same time brings co-channel interference to each other in a case of continuous coverage. An existing soft frequency reuse technology classifies subcarriers in each cell into a primary subcarrier and a secondary subcarrier, where a transmit power threshold of the primary subcarrier is greater than that of the secondary subcarrier; the primary subcarrier may be transmitted at below a certain power threshold in a local cell, while the secondary subcarrier may be transmitted at below a certain power threshold in a central area of the local cell, thereby avoiding inter-cell co-channel interference.

During a process of implementing the present invention, the inventor finds that at least the following problems exist in the prior art:

The existing soft frequency reuse technology is a static interference coordination technology, where the number of subcarriers allocated to each cell in each reuse group is fixed. Therefore, the allocation of the primary subcarrier and secondary subcarrier cannot be adjusted in a cell or between cells according to the load changes in the cell.

SUMMARY

Embodiments of the present invention provide a method and base station for dynamic adjustment of a carrier resource to dynamically adjust the allocation of a primary subcarrier and a secondary subcarrier according to the load change in a cell, thereby improving a utilization rate of a spectrum.

An embodiment of the present invention provides a method for dynamic adjustment of a carrier resource, including: detecting a cell-edge traffic volume of a local cell; and if the cell-edge traffic volume of the local cell is reduced, releasing an idle primary subcarrier resource in the cell as a secondary subcarrier according to a degree of reduction of the cell-edge traffic volume and according to a multiple of a predetermined minimum granularity.

An embodiment of the present invention provides a base station for dynamic adjustment of a carrier resource, including: a detecting module configured to detect a cell-edge traffic volume of a local cell; and a releasing module configured to: if the detecting module has detected that the cell-edge traffic volume of the local cell is reduced, release an idle primary subcarrier resource in the cell as a secondary subcarrier according to the degree of reduction of the cell-edge traffic volume and according to a multiple of a predetermined minimum granularity.

According to the technical solutions provided in the foregoing embodiments of the present invention, when the cell-edge traffic volume of the local cell is changed, the allocation of the primary subcarrier and secondary subcarrier may be adjusted dynamically, which increases the utilization rate of the spectrum and ensures that carrier resources can be utilized properly and adequately.

BRIEF DESCRIPTION OF THE DRAWINGS

To illustrate technical solutions in embodiments of the present invention more clearly, accompanying drawings to be used for describing the embodiments are introduced briefly in the following. Apparently, the accompanying drawings in the following description are only some embodiments of the present invention, and persons of ordinary skill in the art can derive other drawings from these accompanying drawings without creative efforts.

DETAILED DESCRIPTION

Technical solutions of embodiments of the present invention are hereinafter described clearly and completely with reference to accompanying drawings in the embodiments of the present invention. Evidently, the described embodiments are only part rather than all of the embodiments of the present invention. All other embodiments obtained by persons of ordinary skill in the art based on the embodiments of the present invention without creative efforts fall within the protection scope of the present invention.

Figure 1:
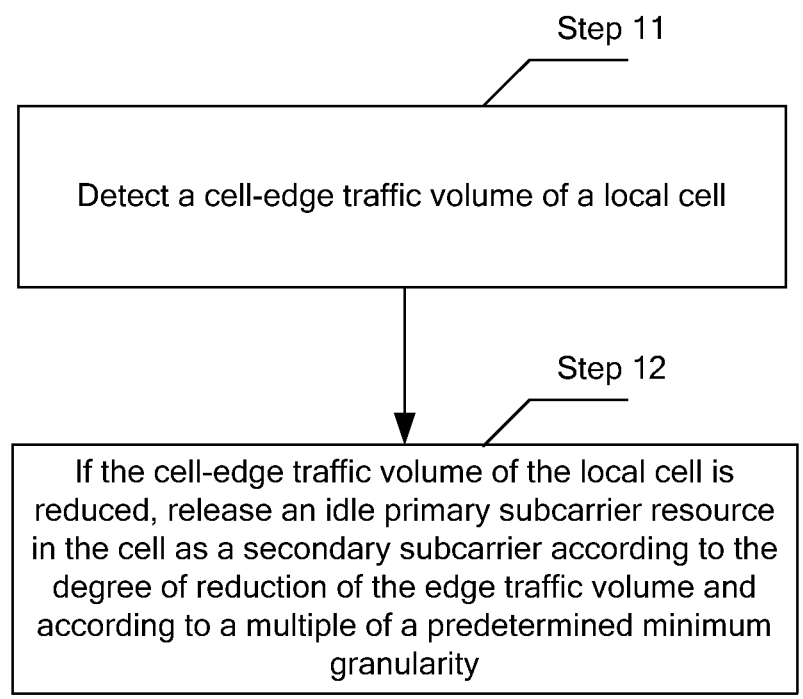
FIG. 1 is a schematic flowchart of a method for dynamic adjustment of a carrier resource according to an embodiment of the present invention.

An embodiment of the present invention provides a method for dynamic adjustment of a carrier resource, which is shown in FIG. 1, and includes:

Step 11: Detect a cell-edge traffic volume of a local cell.

Specifically, the cell-edge traffic volume of a cell is determined by detecting Medium Access Control (MAC) layer data buffer area use status experienced by edge users (e.g., User Equipment (UE)) or by detecting the quantity of cell-edge terminals that are in connected status.

Step 12: If the cell-edge traffic volume of the local cell is reduced, release an idle primary subcarrier resource in the cell as a secondary subcarrier according to a degree of reduction of the cell-edge traffic volume and according to a multiple of a predetermined minimum granularity, where the multiple refers to an integral multiple, for example, one time, two times, or three times. For example, if the degree of reduction of the cell-edge traffic volume is small (in an embodiment, a first threshold value may be preset; when a degree of reduction of a cell-edge traffic volume is smaller than the first threshold value, the degree of reduction of the cell-edge traffic volume is considered to be small), the idle primary subcarrier resource of the cell is released as the secondary subcarrier according to the predetermined minimum granularity; if the degree of reduction of the cell-edge traffic volume is large (in an embodiment, a second threshold value may be preset; when a degree of reduction of a cell-edge traffic volume is greater than the second threshold value, the degree of reduction of the cell-edge traffic volume is considered to be large), the idle primary subcarrier resource of the cell may be released as the secondary subcarrier according to three times the predetermined minimum granularity.

Specifically, the predetermined minimum granularity is a predetermined number of subcarriers, where the predetermined number is determined according to a channel state, a borne service type, and a cell load state, that is, changes of the foregoing three states need to be considered in combination, so as to determine how many subcarriers form the minimum granularity.

In the foregoing method, before step 11, a step 10 may also be included (not shown in FIG. 1) that includes: Subcarriers of the local cell are divided into two groups, a group of primary subcarriers and a group of secondary subcarriers. For example, through a soft frequency reuse technology, 57 cells are divided into groups with three cells each, that is, divided into 19 reuse groups. In this case, primary subcarriers in three cells in each reuse group are mutually orthogonal, and primary subcarriers in cells in different reuse groups may be mutually orthogonal and may also be non-orthogonal; a transmit power threshold of a primary subcarrier is higher than that of a secondary subcarrier, and the primary subcarrier may be transmitted at below a certain power threshold in the local cell, while the secondary subcarrier may be transmitted at below a certain power threshold in a central area of the local cell.

The foregoing method may further include: Sensing a primary subcarrier of a neighboring cell through a predetermined sensing algorithm, where the primary subcarrier is obtained through division, and acquiring an idle primary subcarrier resource of the neighboring cell, where the predetermined sensing algorithm may include an energy detection algorithm or a covariance matrix detection algorithm or a signal feature detection algorithm; or, receiving a result of sensing a primary subcarrier of a neighboring cell, where the primary subcarrier is obtained through division, and the result is reported by a terminal in the cell through a predetermined sensing algorithm, and deciding, according to the sensing result and through a fusion algorithm, an idle primary subcarrier resource of the neighboring cell. Specifically, if there is only one terminal in the cell, the idle primary subcarrier resource of the neighboring cell may be directly determined according to the reported result; if there are two or more than two terminals in the cell, the idle primary subcarrier resource of the neighboring cell may be decided through the fusion algorithm and according to the reported result. The predetermined sensing algorithm may include an energy detection algorithm or a covariance detection algorithm or a signal feature detection algorithm; and the fusion algorithm may make a decision after sensing results reported by multiple terminals pass an "AND" or "OR" algorithm.

The foregoing method may further include: if it has been detected that the cell-edge traffic volume of the local cell is increased, adding the acquired or decided idle primary subcarrier resource of the neighboring cell to a primary subcarrier set of the local cell.

An embodiment of the present invention is illustrated with an example where a soft frequency reuse transport manner is adopted between cellular system cells, and specifically, with an example where there are three cells in a same reuse group, a minimum granularity is one subcarrier, and a terminal uses a signal feature detection algorithm as a sensing algorithm.

Figure 2:
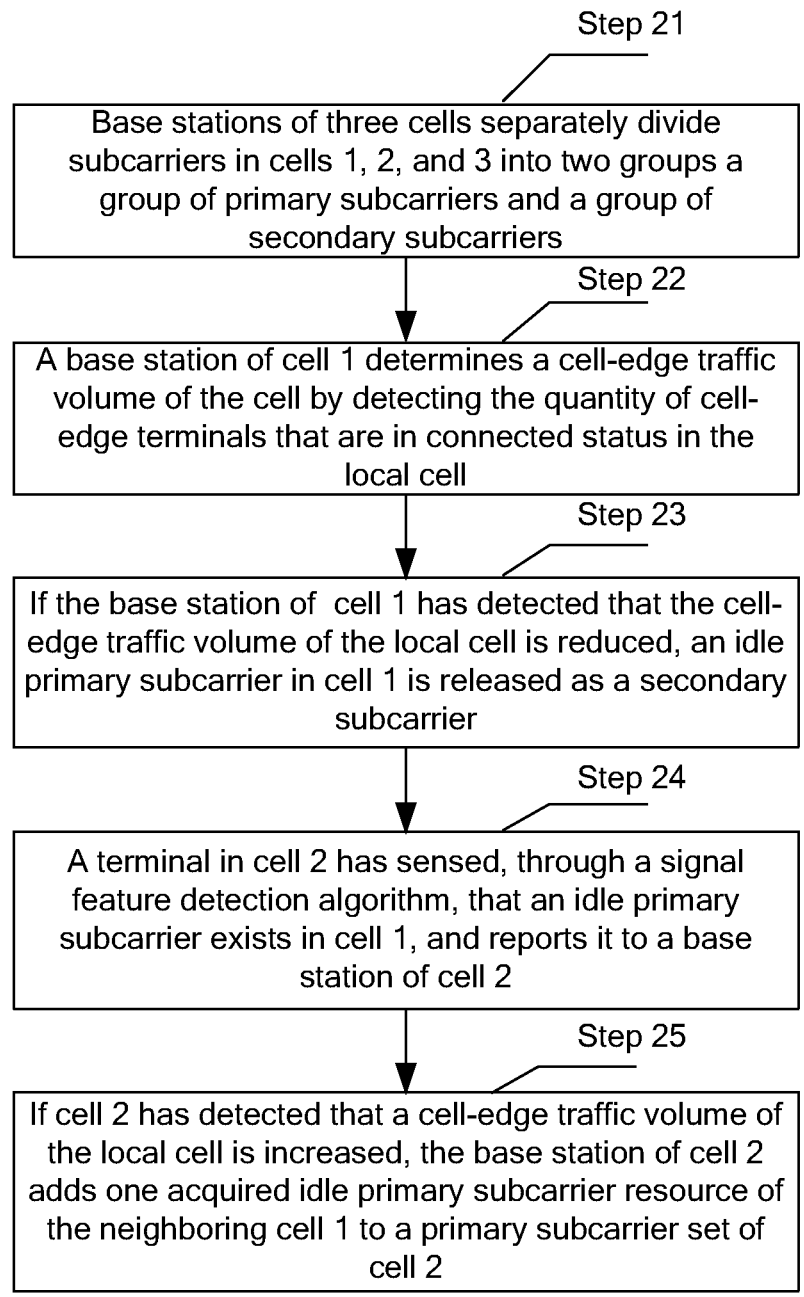
FIG. 2 is a schematic flowchart of a method for dynamic adjustment of a carrier resource illustrated with an example where a soft frequency reuse transport manner is adopted between cellular system cells according to an embodiment of the present invention.
Figure 3:
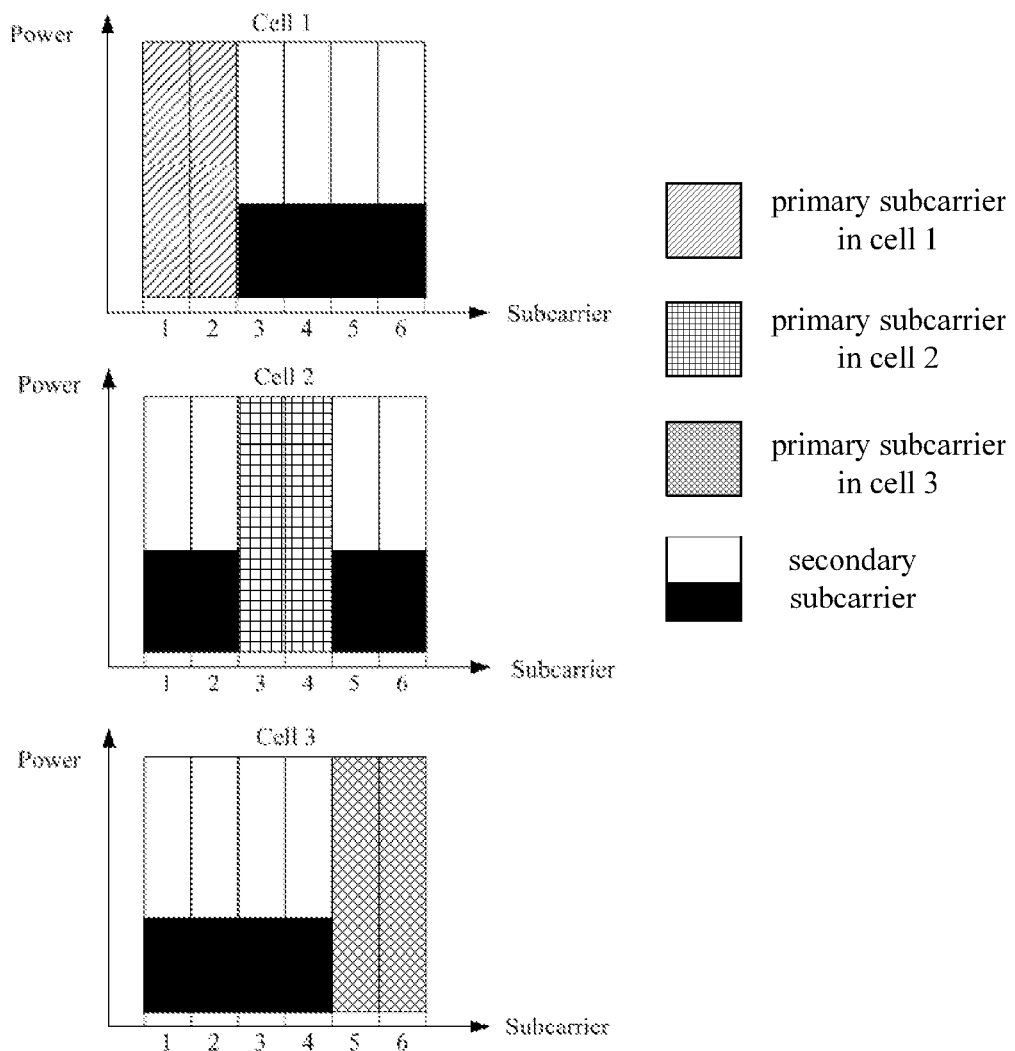
FIG. 3 is a schematic diagram of subcarriers of three cells in a same reuse group in a method in an example where a soft frequency reuse transport manner is adopted between cellular system cells according to an embodiment of the present invention.

As shown in FIG. 2, a specific process is as follows:

Step 21: Base stations in the three cells separately divide subcarriers of cells 1, 2, and 3 into two groups, a group of primary subcarriers and a group of secondary subcarriers. As shown in FIG. 3, primary subcarriers of the three cells are mutually orthogonal. That is, primary subcarriers of cell 1 are carriers 1 and 2; primary subcarriers of cell 2 are carriers 3 and 4; primary subcarriers of cell 3 are carriers 5 and 6; and carrier indices of primary subcarriers of the three cells are not repeated.

Step 22: A base station of cell 1 determines a cell-edge traffic volume of the cell by detecting the quantity of cell-edge terminals that are in connected status and in cell 1.

Figure 4:
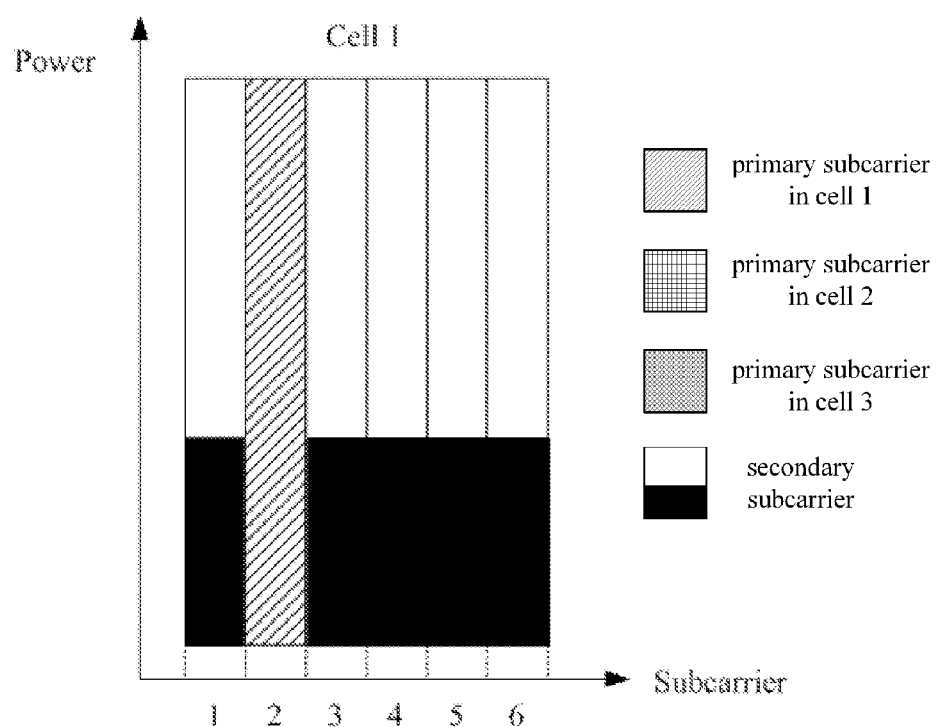
FIG. 4 is a schematic diagram of a carrier after cell 1 releases a primary subcarrier resource of a predetermined minimum granularity as a secondary subcarrier resource, in a method in an example where a soft frequency reuse transport manner is adopted between cellular system cells according to an embodiment of the present invention.

Step 23: If the base station of cell 1 has detected that the cell-edge traffic volume of the local cell is reduced (that is, the quantity of cell-edge terminals that are in the connected status and in cell 1 is reduced), release an idle primary subcarrier in cell 1 as a secondary subcarrier. In this embodiment, for example, one primary subcarrier resource is released as a secondary subcarrier, as shown in FIG. 4.

Step 24: A terminal in cell 2 senses, through the signal feature detection algorithm, that an idle primary subcarrier exists in cell 1, and reports it to a base station of cell 2. In this case, what cell 2 senses are the primary subcarriers obtained through initial division in cell 1, including the primary subcarrier already released as a secondary subcarrier.

Further, a process that the terminal in cell 2 senses the idle primary subcarrier in cell 1 by using a detection algorithm may include: first, converting a detected analog signal such as a pilot signal or a synchronization code in cell 1 into a digital signal; then, multiplying the converted digital signal by a duplicate of the detected signal, where the duplicate of the detected signal is a signal that is preset to be of a same type as the converted digital signal, for example, it may be a delay signal of the converted digital signal; and finally, performing integration and decision processing in sequence on a multiplied signal, and then obtaining a corresponding detection result.

Specifically, a result reported by a terminal in cell 1 may include two bits, that is, each bit represents primary subcarriers 3 and 4 in cell 2, that is, each bit represents one of primary subcarriers 3 and 4; if "0" indicates that a carrier (that is a subcarrier) is idle and "1" indicates that a carrier (that is a subcarrier) is occupied, the result reported by the terminal in cell 1 may be "01." Similarly, a result reported by the terminal in cell 2 may include four bits, that is, each bit represents primary subcarriers 1 and 2 in cell 1 and primary subcarriers 5 and 6 in cell 3, that is, each bit represents one of primary subcarriers 1 and 2 in cell 1 and primary subcarriers 5 and 6 in cell 3; if "0" indicates that a subcarrier is occupied and "1" indicates that a subcarrier is idle, the result reported by the terminal in cell 2 may be "0100."

Further, if there is only one terminal in cell 2, the base station of cell 2 directly determines, according to the reported result, an idle primary subcarrier resource of a neighboring cell; if there are two or more than two terminals in cell 2, the base station of cell 2 decides the idle primary subcarrier resource of the neighboring cell through the fusion algorithm and according to the reported result.

Figure 5:
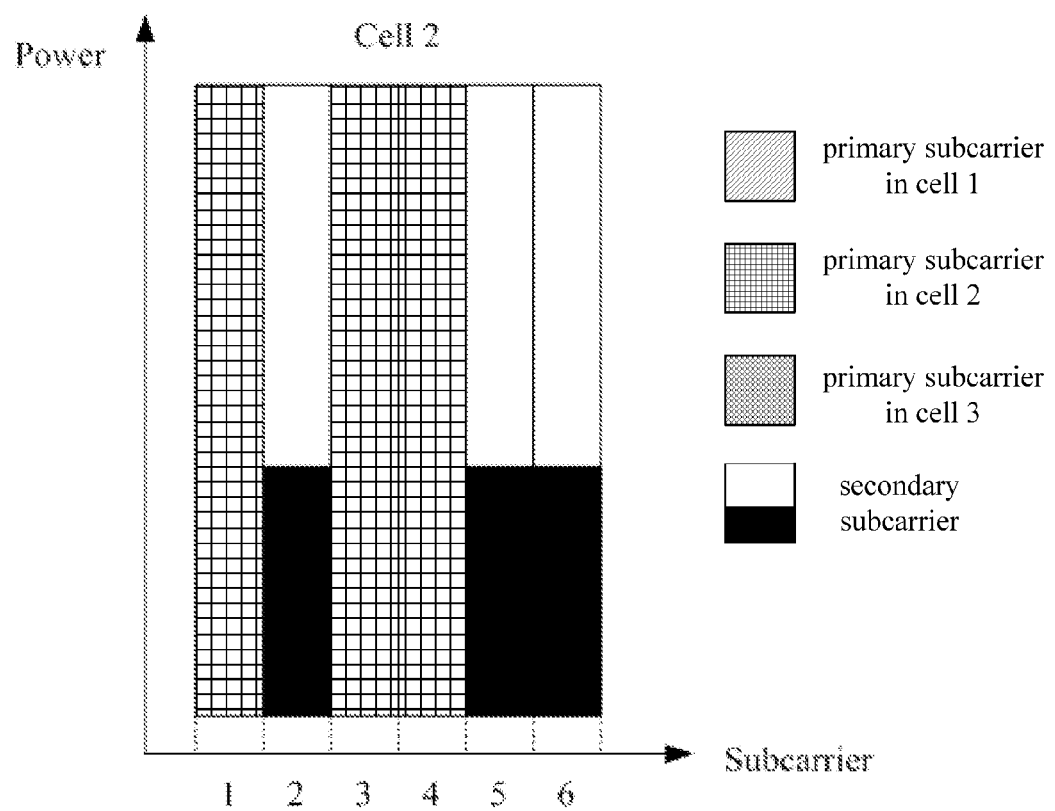
FIG. 5 is a schematic diagram of a carrier after cell 2 adds an idle primary subcarrier resource of cell 1 to a primary subcarrier set of the local cell, in a method in an example where a soft frequency reuse transport manner is adopted between cellular system cells according to an embodiment of the present invention.

Step 25: If cell 2 has detected that a cell-edge traffic volume of the local cell is increased (that is, the quantity of cell-edge terminals that are in the connected status and in cell 2 is increased), the base station of cell 2 adds one acquired idle primary subcarrier resource of the neighboring cell 1 to a primary subcarrier set of the local cell, as shown in FIG. 5.

In the foregoing step, after cell 1 releases one primary subcarrier, if traffic volumes of cell 2 and cell 3 are increased and terminals or base stations in the two cells sense cell 1 at the same time and obtain a same sensing result, both cell 2 and cell 3 add the released primary subcarrier 1 to their own primary subcarrier sets, which causes inter-cell interference. In this case, a sensing time point may be set randomly for each cell to avoid occurrence of a case that multiple cells perform sensing concurrently, or a sensing behavior may also be set to a dynamic triggering manner, and a triggering condition may be that load increase causes a new frequency resource requirement. In this way, the probability of concurrent sensing may be reduced.

Figure 6:
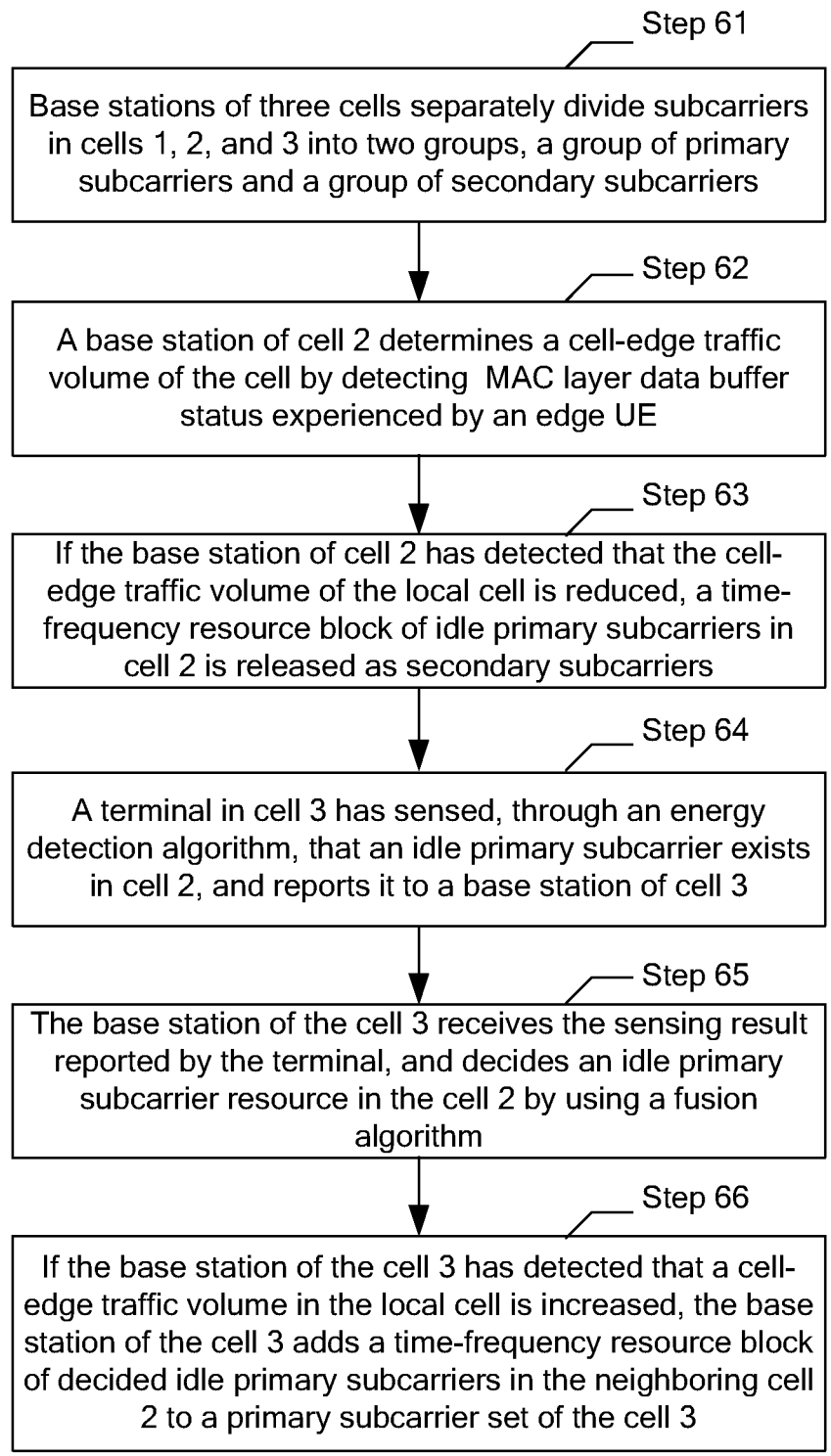
FIG. 6 is a schematic flowchart of a method for dynamic adjustment of a carrier resource illustrated with an example where primary subcarriers are divided among multi-carrier wireless communication system cells by adopting a sawtoothed frequency hopping manner according to an embodiment of the present invention.
Figure 7:
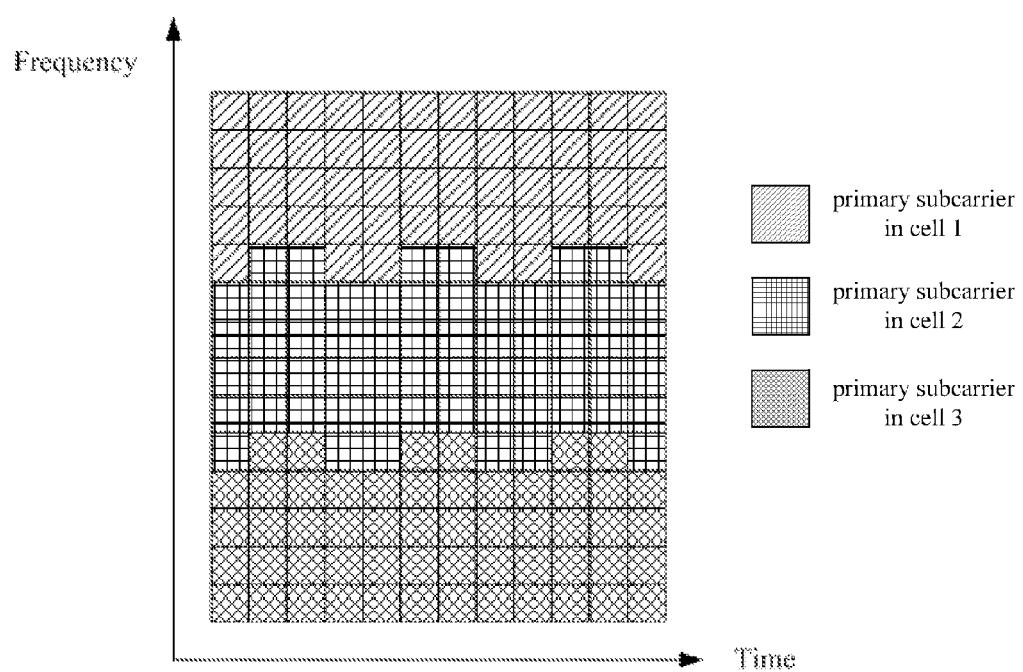
FIG. 7 is a schematic diagram of mutually orthogonal primary subcarriers in three cells of a same reuse group, in a method in an example where primary subcarriers are divided among multi-carrier wireless communication system cells by adopting a saw-toothed frequency hopping manner according to an embodiment of the present invention.

An embodiment of the present invention is illustrated with an example where primary subcarriers are divided among multi-carrier wireless communication system cells by adopting a saw-toothed frequency hopping manner. Specifically, there are three cells in a same reuse group; a time-frequency resource block (saw-toothed) with a minimum granularity of a frequency domain being 12 primary subcarriers is formed after frequency hopping in a time domain; a terminal reports a result to a base station by using an energy detection algorithm as a sensing algorithm; and the base station performs decision by using a fusion algorithm. As shown in FIG. 6, a specific process is as follows:

Step 61: Base stations of the three cells separately divide subcarriers of cells 1, 2, and 3 into two group, a group of primary subcarriers and a group of secondary subcarriers. In addition, as shown in FIG. 7, the primary subcarriers of the three cells are mutually orthogonal, that is, a saw-toothed frequency hopping pattern is formed in the frequency domain and the time domain. Although cell 1 and cell 3 are not neighboring cells, cell 1 and cell 3 may also sense each other.

Step 62: A base station of cell 2 determines a cell-edge traffic volume of the cell by detecting MAC layer data buffer area use status experienced by an edge UE.

Figure 8:
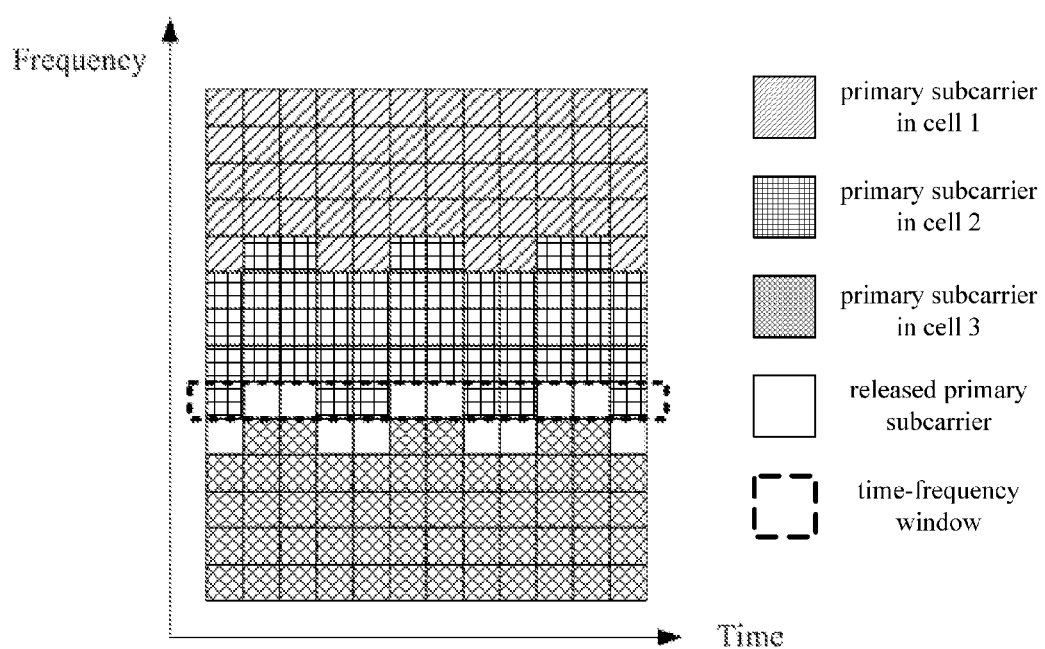
FIG. 8 is a schematic diagram of a carrier after cell 2 releases a primary subcarrier resource of a predetermined minimum granularity as a secondary subcarrier resource, in a method in an example where primary subcarriers are divided among multi-carrier wireless communication system cells by adopting a saw-toothed frequency hopping manner according to an embodiment of the present invention.

Step 63: If the base station of cell 2 has detected that the cell-edge traffic volume of the local cell is reduced (that is, the MAC layer data buffer area use status experienced by the edge UE in cell 2 is unused), a time-frequency resource block of idle primary subcarriers in cell 2 is released as secondary subcarriers. In this embodiment, for example, a time-frequency block of 12 primary subcarriers is released as secondary subcarriers, and what is obtained after releasing is shown in FIG. 8.

Step 64: A terminal in cell 3 senses, through the energy detection algorithm, that an idle primary subcarrier exists in cell 2, and reports it to a base station of cell 3. In this case, what cell 3 senses are primary subcarriers obtained through initial division in cell 2, including the time-frequency resource block of the primary subcarriers already released as secondary subcarriers.

Further, a process that the terminal in cell 3 senses the idle primary subcarrier in cell 2 through the energy detection algorithm may include: First, the terminal in cell 3 presets a time length of a time-frequency window (as shown in FIG. 8, a rectangle having sides made of a dashed line (e.g., a dashed box) represents a time-frequency window, and a length of a horizontal coordinate of the time-frequency window is the time length of the time-frequency window), where the time length is determined by measurement accuracy, for example, if an accuracy requirement is high, the time length is set to one subframe; if the accuracy requirement is low, the time length is set to three subframes. Then, a spectrum of the primary subcarrier in cell 2 is scanned and detected according to a set size of the time-frequency window; if it has been detected that changes energy of a resource block in a dashed box shown in FIG. 8, that is, the time-frequency window, in time are presented as a saw-toothed pattern, it indicates that an idle primary subcarrier exists in cell 2.

Further, a start sensing time point of a terminal in cell 1 may be set to a first subframe, and a sensing period may be set to three subframes; a start sensing time point of the terminal in cell 3 may be set to a second subframe, and a sensing period may be set to three subframes. Such settings avoid that multiple cells perform sensing concurrently and therefore, all add an idle primary subcarrier to primary subcarrier sets of the local cells, and avoid occurrence of inter-cell interference.

Step 65: The base station of cell 3 receives a sensing result reported by the terminal, and decides an idle primary subcarrier resource in cell 2 by using the fusion algorithm. Specifically, an "OR" fusion algorithm may be used. That is, so long as one terminal reports that an idle primary subcarrier exists in cell 2, the base station decides that an idle primary subcarrier exists in cell 2; or an "AND" fusion algorithm may be used, that is, only when all terminals in the cell report that an idle primary subcarrier exists in cell 2, the base station decides that an idle primary subcarrier exists in cell 2.

Figure 9:
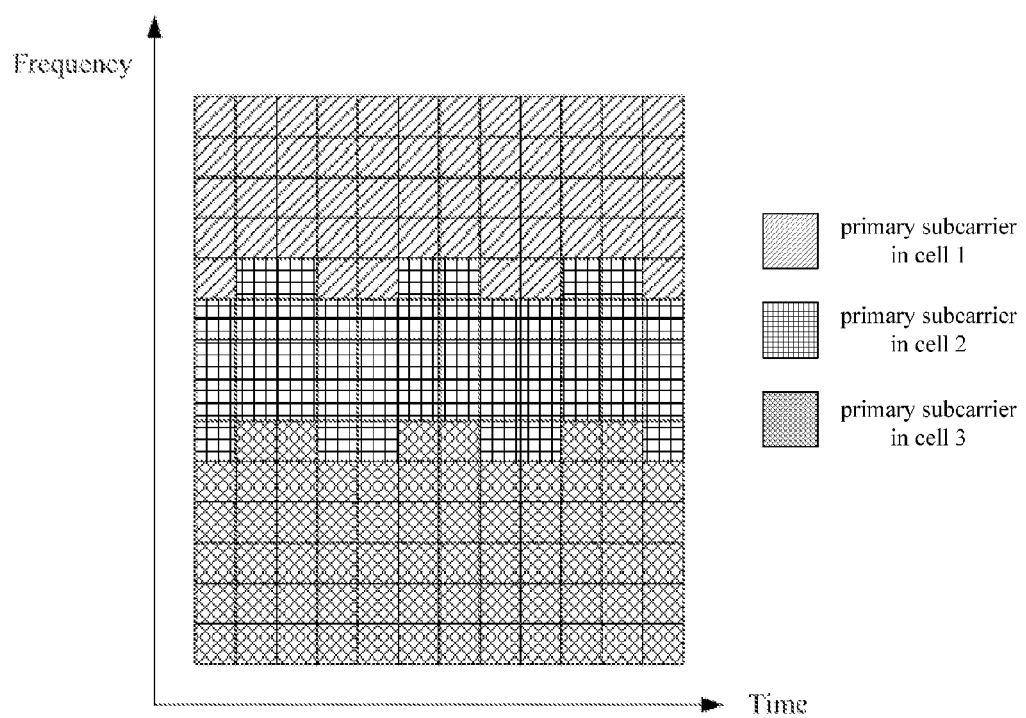
FIG. 9 is a schematic diagram of a carrier after cell 3 adds an idle primary subcarrier resource of cell 2 to a primary subcarrier set of the local cell, in a method in an example where primary subcarriers are divided among multi-carrier wireless communication system cells by adopting a saw-toothed frequency hopping manner according to an embodiment of the present invention.

Step 66: If the base station of cell 3 has detected that a cell-edge traffic volume of the local cell is increased (that is, MAC layer data buffer area use status of an edge UE in cell 3 is being used), the base station of cell 3 adds a time-frequency resource block of decided idle primary subcarriers in the neighboring cell 2 to a primary subcarrier set of the local cell, where the "saw-toothed" frequency hopping pattern is still maintained after the addition, as shown in FIG. 9.

Persons of ordinary skill in the art can understand that all or part of the procedures of the methods in the foregoing embodiments may be completed by a computer program instructing relevant hardware. The program may be stored in a computer readable storage medium. When the program is run, the procedure of the embodiment of each of the foregoing methods is performed. The storage medium may be a magnetic disk, an optical disk, a read-only memory (ROM), a random access memory (RAM) or the like.

In the method for dynamic adjustment of the carrier resource in the embodiment of the present invention, when a cell-edge traffic volume of a local cell is reduced, allocation of a primary subcarrier and a secondary subcarrier may be adjusted dynamically; when the cell-edge traffic volume of the local cell is increased, a detected idle primary subcarrier in a neighboring cell may be added to a primary subcarrier set of the local cell. That is, the primary subcarrier and secondary subcarrier in the local cell and primary subcarriers between cells may be adjusted dynamically according to a cell load state, which achieves a purpose of resource sharing, ensures that carrier resources can be utilized properly and adequately, and increases a utilization rate of a spectrum. Meanwhile, cells can actively obtain idle spectrum information of their neighboring cells in a sensing manner, and signaling exchanges between base stations are not needed, which saves signaling overheads and avoids a transmission delay. If a sensing time point of each cell is set randomly or a sensing behavior is set to a dynamic triggering manner, inter-cell interference may be avoided, which achieves a purpose of inter-cell interference coordination and increases cell-edge throughput.

Figure 10:
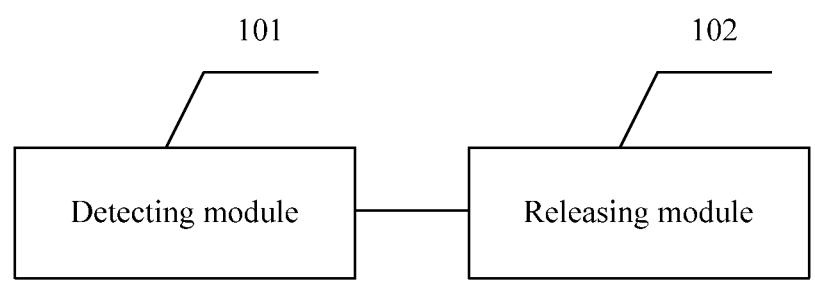
FIG. 10 is a schematic structural diagram of a base station for dynamic adjustment of a carrier resource according to an embodiment of the present invention.

An embodiment of the present invention provides a base station for dynamic adjustment of a carrier resource, which is shown in FIG. 10, and includes:

A detecting module 101 is configured to detect a cell-edge traffic volume of a local cell.

Specifically, a cell-edge traffic volume of a cell is determined by detecting MAC layer data buffer area use status experienced by an edge UE or by detecting the quantity of cell-edge terminals that are in connected status.

A releasing module 102 is configured to: if the detecting module 101 has detected that the cell-edge traffic volume of the local cell is reduced, release an idle primary subcarrier resource in the cell as a secondary subcarrier according to a degree of reduction of the cell-edge traffic volume and according to a multiple of a predetermined minimum granularity, where the multiple refers to an integral multiple, for example, one time, two times, or three times. For example, if the degree of reduction of the cell-edge traffic volume is small (in an embodiment, a first threshold value may be preset; when a degree of reduction of a cell-edge traffic volume is smaller than the first threshold value, the degree of reduction of the cell-edge traffic volume is considered to be small), the idle primary subcarrier resource of the cell may be released as the secondary subcarrier according to the predetermined minimum granularity; if the degree of reduction of the cell-edge traffic volume is large (in an embodiment, a second threshold value may be preset; when a degree of reduction of a cell-edge traffic volume is greater than the second threshold value, the degree of reduction of the cell-edge traffic volume is considered to be large), the idle primary subcarrier resource of the cell may be released as the secondary subcarrier according to three times the predetermined minimum granularity.

Specifically, the predetermined minimum granularity is a predetermined number of subcarriers, where the predetermined number is determined according to a channel state, a borne service type, and a cell load state, that is, the changes of the foregoing three states need to be considered in combination, so as to determine how many subcarriers form the minimum granularity.

The foregoing base station may further include a carrier dividing module (not illustrated in FIG. 10), configured to: divide subcarriers of the local cell into a group of primary subcarriers and a group of secondary subcarriers. For example, through a soft frequency reuse technology, 57 cells are divided into groups with three cells each, that is, divided into 19 reuse groups. In this case, primary subcarriers in three cells in each reuse group are mutually orthogonal, and primary subcarriers in cells in different reuse groups may be mutually orthogonal and may also be non-orthogonal; a transmit power threshold of a primary subcarrier is higher than that of a secondary subcarrier, and the primary subcarrier may be transmitted at below a certain power threshold in a local cell, while the secondary subcarrier may be transmitted at below a certain power threshold in a central area of the local cell.

The foregoing apparatus may further include (not illustrated in FIG. 10): a sensing module configured to: sense a primary subcarrier of a neighboring cell through a predetermined sensing algorithm, where the primary subcarrier is obtained through division, and acquire an idle primary subcarrier resource of the neighboring cell, where the predetermined sensing algorithm may include an energy detection algorithm or a covariance matrix detection algorithm or a signal feature detection algorithm; or, a sensing result receiving module configured to: receive a result of sensing a primary subcarrier of a neighboring cell, where the primary subcarrier is obtained through division, and the result is reported by a terminal in the cell through a predetermined sensing algorithm, and acquire an idle primary subcarrier resource of the neighboring cell, where the predetermined sensing algorithm may include an energy detection algorithm or a covariance matrix detection algorithm or a signal feature detection algorithm; and a fusing module configured to decide the idle primary subcarrier resource of the neighboring cell through a fusion algorithm and according to the sensing result received by the sensing result receiving module, where the predetermined sensing algorithm may include the energy detection algorithm or covariance matrix detection algorithm or signal feature detection algorithm; the fusion algorithm may make a decision after sensing results reported by multiple terminals pass an "AND" or "OR" algorithm.

Specifically, if there is only one terminal in a cell, only the sensing result receiving module needs to be included, that is, the idle primary subcarrier resource of the neighboring cell may be directly determined according to the reported result; if there are two or more than two terminals in the cell, the fusing module further needs to be included, that is the idle primary subcarrier resource of the neighboring cell may be decided through the fusion algorithm and according to the reported result.

The foregoing apparatus may further include: an adding module (not illustrated in FIG. 10), configured to: if it has been detected that the cell-edge traffic volume of the local cell is increased, add the acquired or decided idle primary subcarrier resource of the neighboring cell to a primary subcarrier set of the local cell.

A specific implementation manner of the processing function of each module included in the foregoing apparatus has already been described in the foregoing method embodiment, and is described repeatedly herein.

In the method and base station for dynamic adjustment of the carrier resource in the embodiments of the present invention, when the cell-edge traffic volume of the local cell is reduced, the allocation of the primary subcarrier and secondary subcarrier may be adjusted dynamically; when the cell-edge traffic volume of the local cell is increased, the detected idle primary subcarrier in the neighboring cell may be added to the primary subcarrier set of the local cell. That is, the primary subcarrier and secondary subcarrier in the local cell and primary subcarriers between cells may be adjusted dynamically according to the cell load state, which achieves the purpose of resource sharing, ensures that carrier resources can be utilized properly and adequately, and increases a utilization rate of spectrum. Meanwhile, cells can actively obtain idle spectrum information of their neighboring cells in a sensing manner, and signaling exchanges between base stations are not needed, which saves signaling overheads and avoids a transmission delay. If a sensing time point of each cell is set randomly or a sensing behavior is set to a dynamic triggering manner, inter-cell interference may be avoided, which achieves a purpose of inter-cell interference coordination and increases cell-edge throughput.

The foregoing descriptions are merely exemplary implementation manners of the present invention, but does not limit the protection scope of the present invention. Any modification or replacement that can be easily thought of by persons skilled in the art within the technical scope disclosed in the present invention shall fall within the protection scope of the present invention. Therefore, the protection scope of the present invention is subject to the protection scope of the claims.

What is claimed is:

1. A method for dynamic adjustment of a carrier resource comprising:
   detecting a cell-edge traffic volume of a local cell;
   comparing the cell-edge traffic volume to a first threshold value and a second threshold value to determine a degree of reduction of the cell-edge traffic volume;
   releasing an idle primary subcarrier resource in the local cell as a secondary subcarrier according to the degree of reduction of the cell-edge traffic volume and according to a multiple of a predetermined minimum granularity when the cell-edge traffic volume of the local cell is reduced;
   sensing a primary subcarrier of a neighboring cell through a predetermined sensing algorithm, wherein the primary subcarrier is obtained through division, and acquiring an idle primary subcarrier resource in the neighboring cell; and
   receiving a result of sensing a primary subcarrier of a neighboring cell, wherein the primary subcarrier is obtained through division, and wherein the result is reported by a terminal in a cell through a predetermined sensing algorithm, and deciding, according to the sensing result and through a fusion algorithm, an idle primary subcarrier resource of the neighboring cell.

2. The method according to claim 1, wherein before detecting the cell-edge traffic volume of the local cell, the method further comprises dividing subcarriers of the local cell into two groups, wherein the two groups comprise a group of primary subcarriers and a group of secondary subcarriers, and wherein the primary subcarriers of each cell in a same reuse group as the local cell are mutually orthogonal.

3. The method according to claim 1, wherein the predetermined minimum granularity is a predetermined number of subcarriers, and wherein the predetermined number is determined according to a channel state, a borne service type, and a cell load state.

4. The method according to claim 1, further comprising adding the acquired or decided idle primary subcarrier resource of the neighboring cell to a primary subcarrier set of the local cell when the cell-edge traffic volume of the local cell is increased.

5. The method according to claim 1, wherein the cell-edge traffic volume of the local cell is detected by determining Medium Access Control (MAC) layer data buffer area use status experienced by edge users.

6. The method according to claim 1, wherein the cell-edge traffic volume of the local cell is detected by determining a quantity of cell-edge terminals that are in a connected status.

7. A base station for dynamic adjustment of a carrier resource comprising:
   a detecting module configured to detect a cell-edge traffic volume of a local cell;
   a comparing module configured to compare the cell-edge traffic volume to a first threshold value and a second threshold value to determine a degree of reduction of the cell-edge traffic volume;
   a releasing module configured to release an idle primary subcarrier resource in the local cell as a secondary subcarrier according to the degree of reduction of the cell-edge traffic volume and according to a multiple of a predetermined minimum granularity when the detecting module has detected that the cell-edge traffic volume of the local cell is reduced, and
   wherein the base station is further configured to:
      sense a primary subcarrier of a neighboring cell through a predetermined sensing algorithm, wherein the primary subcarrier is obtained through division, and acquire an idle primary subcarrier resource in the neighboring cell; and
      receive a result of sensing a primary subcarrier of a neighboring cell, wherein the primary subcarrier is obtained through division, and wherein the result is reported by a terminal in a cell through a predetermined sensing algorithm, and decide, according to the sensing result and through a fusion algorithm, an idle primary subcarrier resource of the neighboring cell.

8. The base station according to claim 7, further comprising a carrier dividing module configured to divide subcarriers of the local cell into two groups, wherein the two groups comprise a group of primary subcarriers and a group of secondary subcarriers, and wherein the primary subcarriers of each cell in a same reuse group as the local cell are mutually orthogonal.

9. The base station according to claim 7, wherein the predetermined minimum granularity in the releasing module is a predetermined number of subcarriers, and wherein the predetermined number is determined according to a channel state, a borne service type, and a cell load state.

10. The base station according to claim 7, further comprising an adding module configured to add the acquired or decided idle primary subcarrier resource of the neighboring cell to a primary subcarrier set of the local cell when the cell-edge traffic volume of the local cell is increased.

11. The base station according to claim 7, wherein the cell-edge traffic volume of the local cell is detected by determining Medium Access Control (MAC) layer data buffer area use status experienced by edge users.

12. The base station according to claim 7, wherein the cell-edge traffic volume of the local cell is detected by determining a quantity of cell-edge terminals that are in a connected status.

* * * * *